United States Patent
Romine et al.

(10) Patent No.: US 11,614,732 B2
(45) Date of Patent: Mar. 28, 2023

(54) SYSTEM AND METHOD FOR COLLECTION AND MANAGEMENT OF DATA FROM SENSORY ARRAYS

(71) Applicant: LegacySecure, Inc., New Rochelle, NY (US)

(72) Inventors: Chris Romine, Riverside, CA (US); Noah Klein, New Rochelle, NY (US); Patrick Cooley, Arlington, VA (US); David Robinson, Montgomery Village, MD (US); Jim Kuster, Sagamore Hills, OH (US)

(73) Assignee: LegacySecure, Inc., New Rochelle, NY (US)

( * ) Notice: Subject to any disclaimer, the term of this patent is extended or adjusted under 35 U.S.C. 154(b) by 0 days.

(21) Appl. No.: 17/239,234

(22) Filed: Apr. 23, 2021

(65) Prior Publication Data
US 2022/0342402 A1 Oct. 27, 2022

(51) Int. Cl.
*G05B 19/418* (2006.01)
*G06Q 50/02* (2012.01)
*G05B 19/048* (2006.01)

(52) U.S. Cl.
CPC ..... *G05B 19/41875* (2013.01); *G05B 19/048* (2013.01); *G06Q 50/02* (2013.01)

(58) Field of Classification Search
CPC . G05B 19/41875; G05B 19/048; G06Q 50/02
See application file for complete search history.

(56) References Cited

U.S. PATENT DOCUMENTS

| | | | | |
|---|---|---|---|---|
| 5,163,454 | A | * 11/1992 | Clemons | G01N 1/286 |
| | | | | 131/905 |
| 10,472,587 | B2 | * 11/2019 | Vanhercke | C11B 7/00 |
| 2017/0317885 | A1 | * 11/2017 | Mahadevan | H04L 41/0816 |

\* cited by examiner

*Primary Examiner* — Tejal Gami
(74) *Attorney, Agent, or Firm* — Sofer & Haroun, LLP

(57) ABSTRACT

A process is provided for the management of environmental data for tobacco production. The process includes inserting at least one sensor into a collection of tobacco leaves and connecting one or more of the sensors to a communication node for collecting data. A DNCP server is adapted to receive at least one communication from a communication node to identify a data gateway among a plurality of available gateways. Environmental data is transmitted from the sensor and communication node to the gateway for transmission to a server.

6 Claims, 7 Drawing Sheets

Data Collection Sheet 200

| Product Description | NODE ID /sensor ID | Date Range | Moisture | Humidity | Temperature |
|---|---|---|---|---|---|
| Warehouse ID #1 Pilones ID#1 | node ID "a" sensor 1 | 1/1/XX – 2/1/xx | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... |
|  | node ID "a" sensor 2 | 1/1/XX – 2/1/xx | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... |
| Warehouse ID#1 Pilones ID #2 | node ID "b" sensor 1 | 1/1/XX – 2/1/xx | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... |
|  | node ID "b" sensor 2 | 1/1/XX – 2/1/xx | date X – max/min/range/; date; X+1 max/min/range; date X + 2 – max/min/range/; date; X + 3 max/mii/range.... | date X – max/min/range/; date; X+1 max/min/range; date X + 2 – max/min/range/; date; X + 3 max/min/range.... | date X – max/min/range/; date; X+1 max/min/range; date X + 2 – max/min/range/; date; X + 3 max/min/range.... |

Figure 7

SYSTEM AND METHOD FOR COLLECTION AND MANAGEMENT OF DATA FROM SENSORY ARRAYS

FIELD OF THE INVENTION

This application relates to a system and method for the collection and management of data. More particularly, the present application relates to a system and method for the collection and management of data from one or more sensors, and the structuring and management of data therefrom.

DESCRIPTION OF RELATED ART

In the tobacco and cigar industry, fermentation is the process that accounts for the majority of the changes and distinctions in cigar tobaccos. Fermentation is a process for allowing the tobacco to heat up under the pressure of its own weight. The fermentation is usually broken into at least two stages.

In the first stage of fermentation the tobacco leaves are bunched together in "gavillas" (small bunches) which are in turn piled in the small piles (e.g. ½ to 1 meters). The piles are referred to as "pilones." Owing to the natural decomposition of the tobacco leaves and under the pressure and weight of the piles, the temperature can run in the area of 90°-100° Fahrenheit. In some instances, the pilones are broken down, cooled and reformed if the temperature is excessive. This first fermentation process takes about a month until the leaves are fermented and aged at which point the leaves are sorted and classified according to color, texture, and type of leaf including wrappers, binders, and fillers wrappers based on various qualities and characteristics of the leaves and other pre-processing steps (e.g. some sorting and leaf preparation may occur before this first fermentation).

The second fermentation step typically includes a re-humidification of the leaves and regathering into much larger "burros" which can be 1— 2 meters in in height (and a meter or more in diameter). The burros can weigh more than a thousand pounds, and with the added water, the fermentation process begins anew and more intensely. This second fermentation can last 60 days or more releasing large amounts of ammonia and developing the flavor profile of the leaves. During this fermentation, again the temperature rises over 100° Fahrenheit up to almost 140° or more. As with the Pilones, if the temperature becomes excessive it can damage the leaves, so the burros are unraveled, cooled, and restacked for additional fermentation if needed.

During both processes, carefully controlling the temperature and humidity allows for the removal of the unwanted ammonia and impurities while simultaneously developing the particular taste, small and "flavor" the leaves. If the humidity or temperature at any point is too high, or too low, or changes too fast, it could negatively affect the tobacco leaves.

In the prior art, such fermentation practices developed over centuries or decades as more of an art form than anything else. Although the principals of fermentation were known, the climate control was simply done by observation and industry practices. More recently, the tobacco industry, including the cigar tobacco industry, has adopted more scientific means of fermentation control including the use of thermometers and hygrometers.

Never-the-less the state of the art does not allow for full climate control on a real time basis. Physical constraints associated with the pilones and burros within the large storage/fermentation warehouses, make it difficult to obtain constant accurate data. FIG. 1 shows a prior art image of a tobacco warehouse with series of tobacco leaf pilones. As shown in the diagram current fermentation control experts, aside from their experience may use a thermometer in the room as well as one or more individual thermometers/hygrometers for the piles. Often, a fermentation director would use one thermometer/hygrometer, simply walking around to the different pilones. As shown in FIG. 1, more than one thermometer/hygrometer may be used, but it is noted that such thermometers/hygrometers are simply instruments taking individual readings, at various times only when used by the engineer.

OBJECTS AND SUMMARY

The present arrangement solves the shortcomings of the prior art and provide a system and arrangement for actively and continuously monitoring environmental conditions of tobacco fermentation in real time using an improved sensor arrangement. Such sensors and the related network are easily adaptable to provide real time environmental conditions of fermentation even in large warehouse environments.

Moreover, the sensor and networks are easily adaptable to add and remove sensors without significant IT infrastructure training. Applicants note that the conditions in tobacco fermentation warehouses is not ideal for electronic equipment, nor are IT technicians readily available. The present system and process makes it easy to quickly arrange sensors to be inserted into pilones or burros quickly after they are formed, and with such sensors and connected nodes being readily connectable, both with wire connections and wireless connections to common gateways without significant configuration efforts on the parts of the workers. Such an arrangement provides a quickly configurable network capable of providing real time environmental data for tobacco fermentation warehouses, that is easy to set up and easy to re-arrange as the various pilones and burros are broken down, and new ones are formed.

To this end a process is provided for the management of environmental data for tobacco production. The process includes inserting at least one sensor into a collection of tobacco leaves and connecting one or more of the sensors to a communication node for collecting data. A DNCP server is adapted to receive at least one communication from a communication node to identify a data gateway among a plurality of available gateways. Environmental data is transmitted from the sensor and communication node to the gateway for transmission to a server.

BRIEF DESCRIPTION OF THE DRAWINGS

The present invention can be best understood through the following description and accompanying drawing, wherein:

FIG. 7 illustrates a data collection sheet for sensors and node data in accordance with one embodiment.

DETAILED DESCRIPTION

Figure 1:
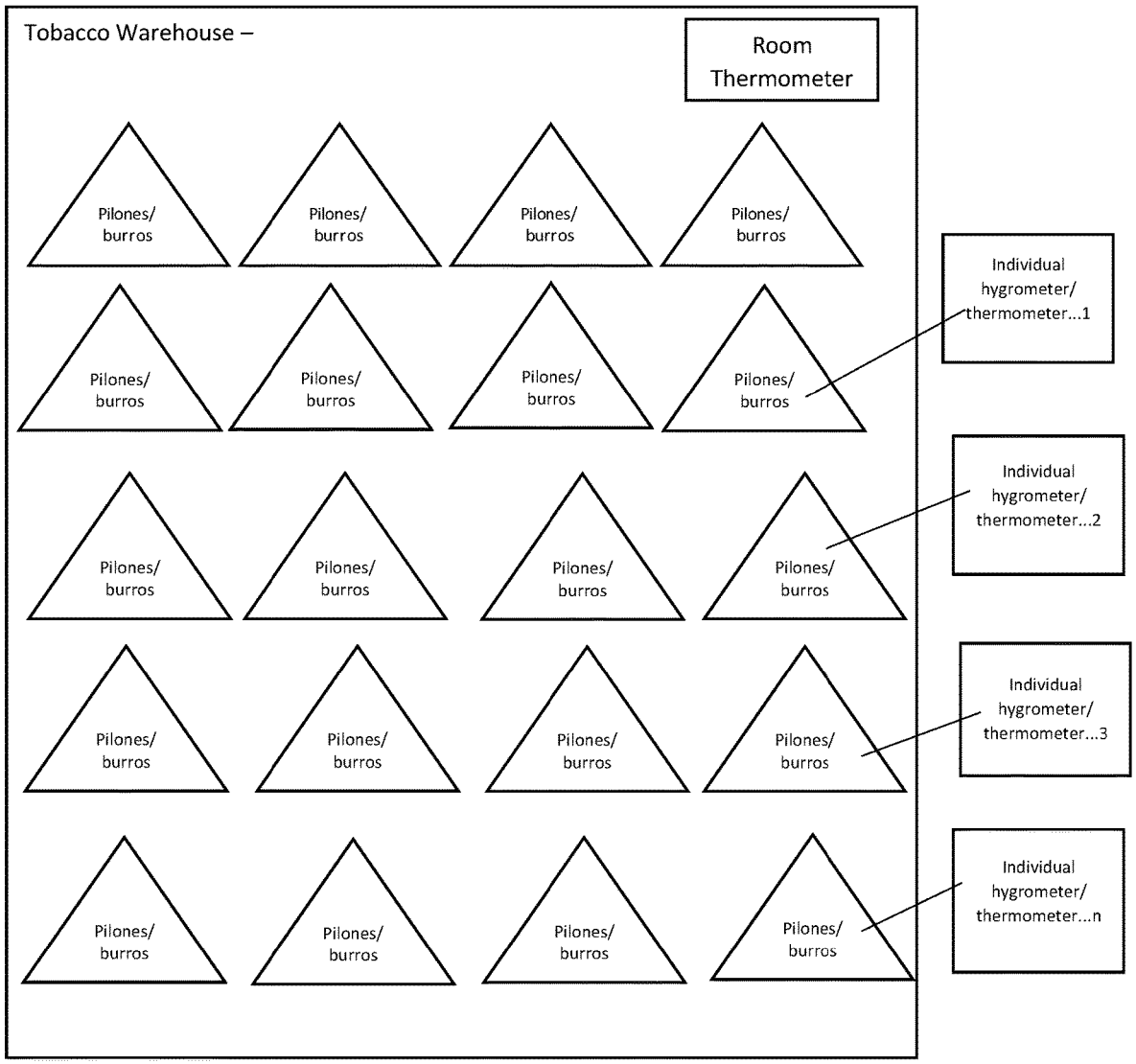
FIG. 1 illustrates a prior art arrangement of a tobacco fermentation warehouse.
Figure 2:
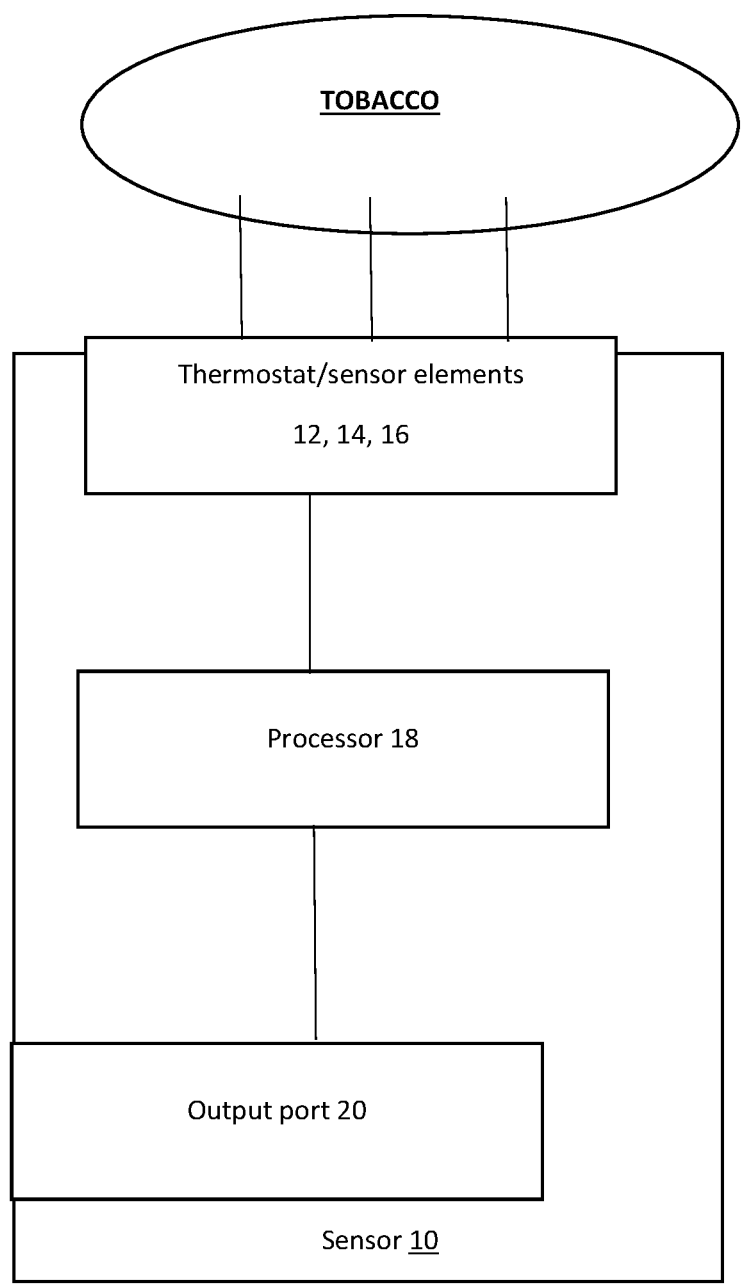
FIG. 2 illustrates a sensor element in accordance with one embodiment.

In one embodiment of the present arrangement as shown in FIG. 2 a sensor element 10 is provided. In a preferred arrangement sensor 10 may have any one or more of a thermometer 12, a humidity detector 14, and a moisture detector 16. It is noted that sensor 10 may have additional environmental detectors or less as desired by the engineer such as for example an ammonia detector. Additionally, such detectors and thermometers 12, 14, and 16 may be in various physical forms. For example, thermometer 12 may be formed as a solid metal thermocouple as such design is more durable under the tobacco fermentation conditions. Additionally, all of the thermometer 12 and detectors 14 and 16 can be separate from one another or included on a common sensor chip.

In any case, thermometer 12 and detectors 14 and/or 16 may be connected to a basic processor 18 capable of collecting the data generated by thermometer 12 and detectors 14 and 16 and passing through to a port 20 for transmission (i.e. wireline transmission) to a node of collection point.

Figure 3:
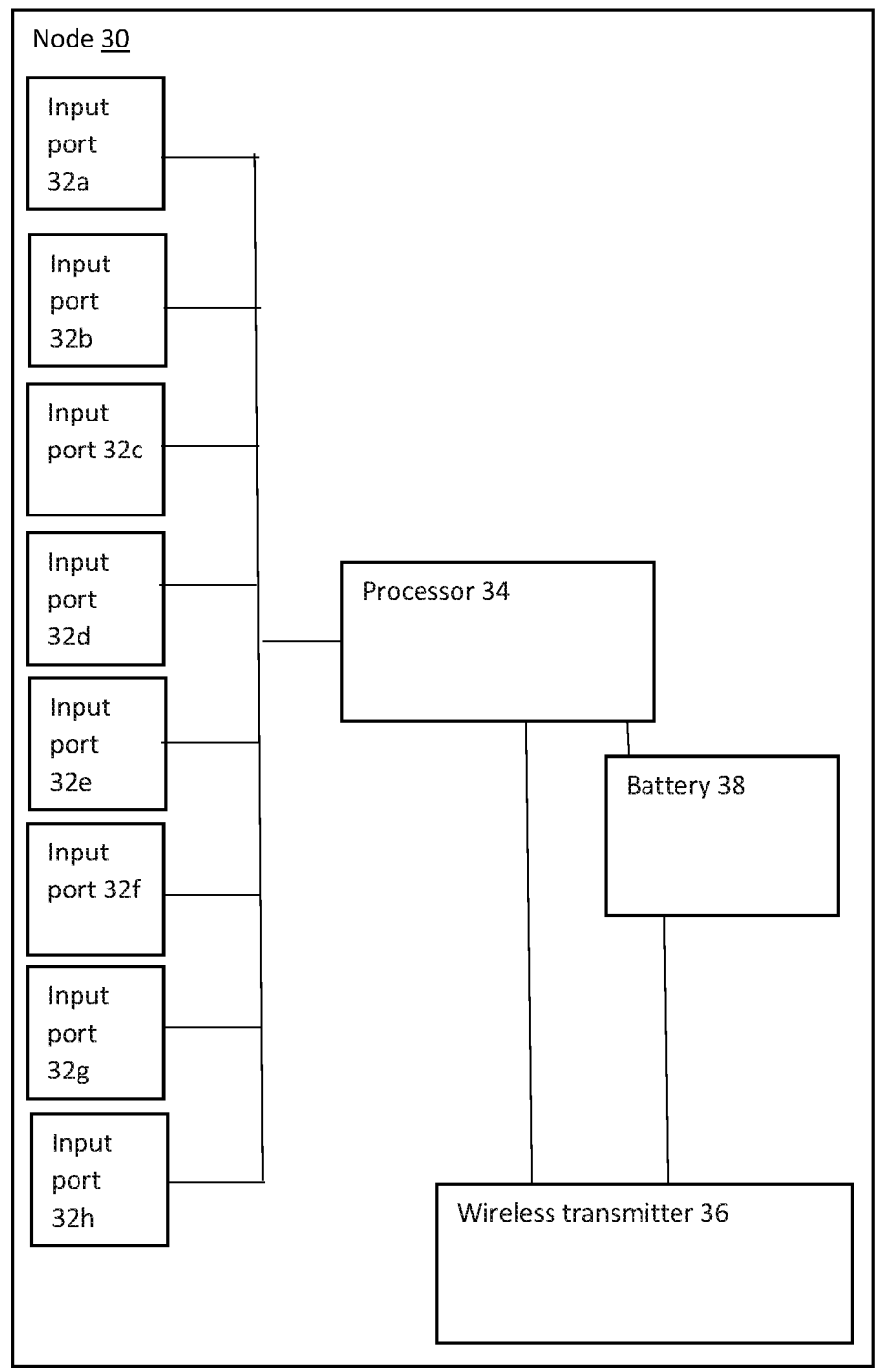
FIG. 3 illustrates a node for supporting sensors in accordance with one embodiment.

In another embodiment, as shown in FIG. 3, a node 30 is shown having a plurality of ports 32a-32x (e.g. eight ports would be 32a-32h). It is noted that in the examples of the specification node 30 is capable of supporting eight ports 32 but it is understood that this is not intended to be a limitation on the scope of the invention. Additional ports 32 or lesser ports 32 may be used depending upon the support capacity of node 30. Such ports 32 are each configured to accept a wireline connection from output port 20 of one of sensors 10. Node 30 is supplied with a processor 34 for coupling with ports 32 to collect and process data from sensors 10. Such processing may include format correction, time stamping, or other such basic data collection and processing parameters.

Node 30 may also have at least one wireless communication module 36 and a battery 38 (e.g. nine volt battery). Communication module 36 is connected with processor 34 and configured to transmit data to a gateway as described in more detail below. Such communication module is typically a wireless transmitter and can provide a fixed address/code for node 30.

Figure 4:
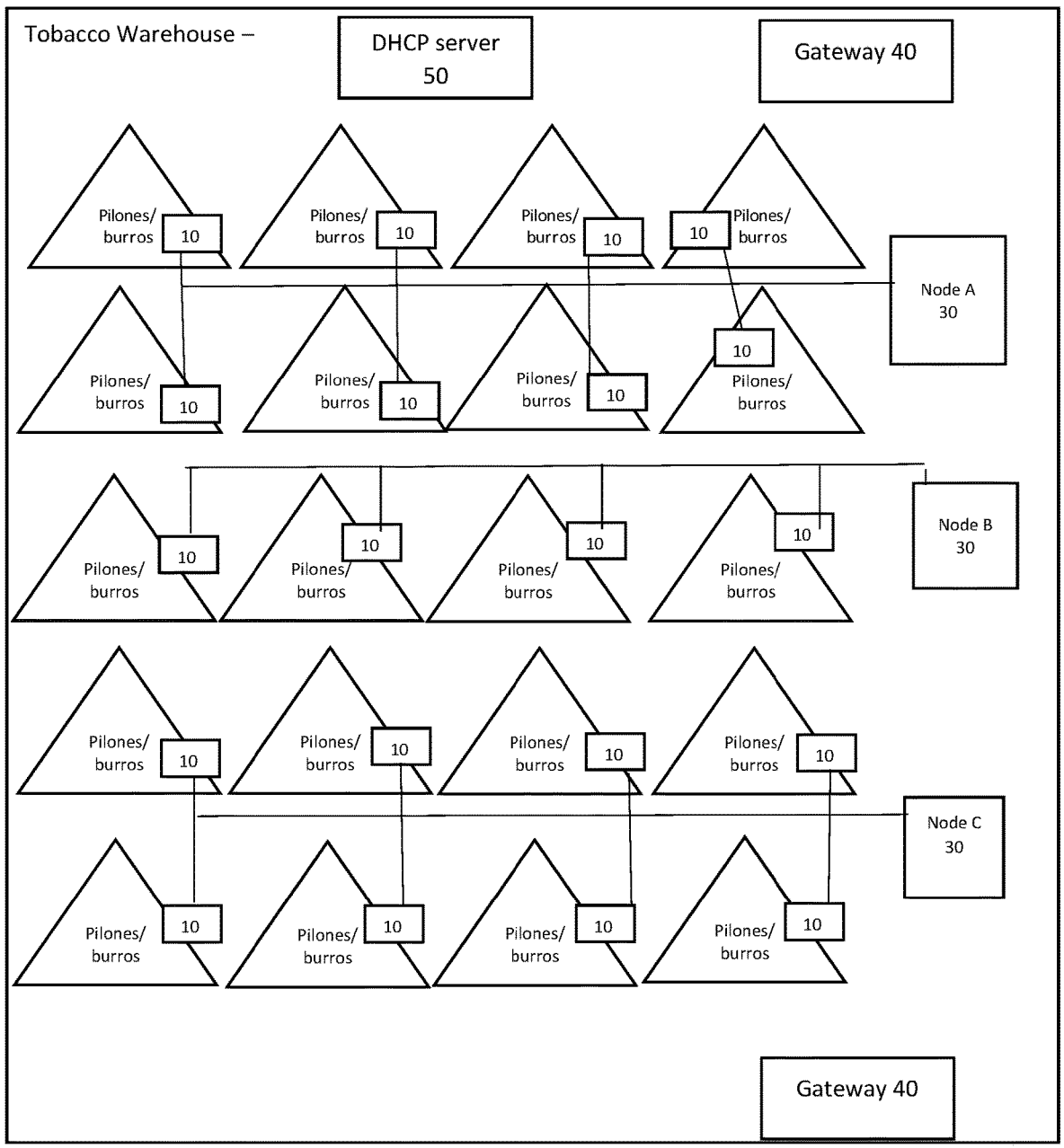
FIG. 4 illustrates an arrangement of a tobacco fermentation warehouse, with sensors, gateways and a DNCP server, in accordance with one embodiment.

As shown in FIG. 4 a node 30 may be coupled to eight sensors 10, and two or more nodes 30 may be each coupled to a gateway 40. A gateway is a wireless capable support device for coupling the wireless data being received from sensors 10, via nodes 30 to the cloud/internet and ultimately to a management server 50 (described in more detail below). Each gateway 40 is capable of supporting data streams collected from up to two hundred and fifty nodes 30 depending on capacity.

In the example shown in FIG. 4, there three nodes 30 in a warehouse, each one which is connected to a plurality of sensors 10, each of which turn inserted within one of the pilones or burros. It is noted that in a normal fermentation arrangement normally a fermentation floor would have either one of pilones or burros. FIG. 4 is only intended to show the schematic setup of gateway 40, nodes 30, and sensors 10. It is understood that that such arrangements can be used in large fermentation floors with many iterations over of the arrangement of FIG. 4. In fact, such arrangements of sensors 10 described herein may also be used outside of fermentation, including aging rooms, storage rooms etc. . . . and any other area of tobacco production that would benefit from environmental controls.

Also included in the warehouse is at least one DNCP (Dynamic Node Configuration Protocol) server 50. The role of DNCP server 50 is to automatically assign radio network identifiers to nodes 30 and to correctly connect them with a preferred gateway 40. As shown in FIG. 4, there may be multiple gateways 40 in a single warehouse arrangement. For many reasons, such as physical constraints, distance, physical blockages (i.e. walls) overloaded networks etc . . . , for each node 30 any given gateway 40 may provide a better connection than another.

Figure 5:
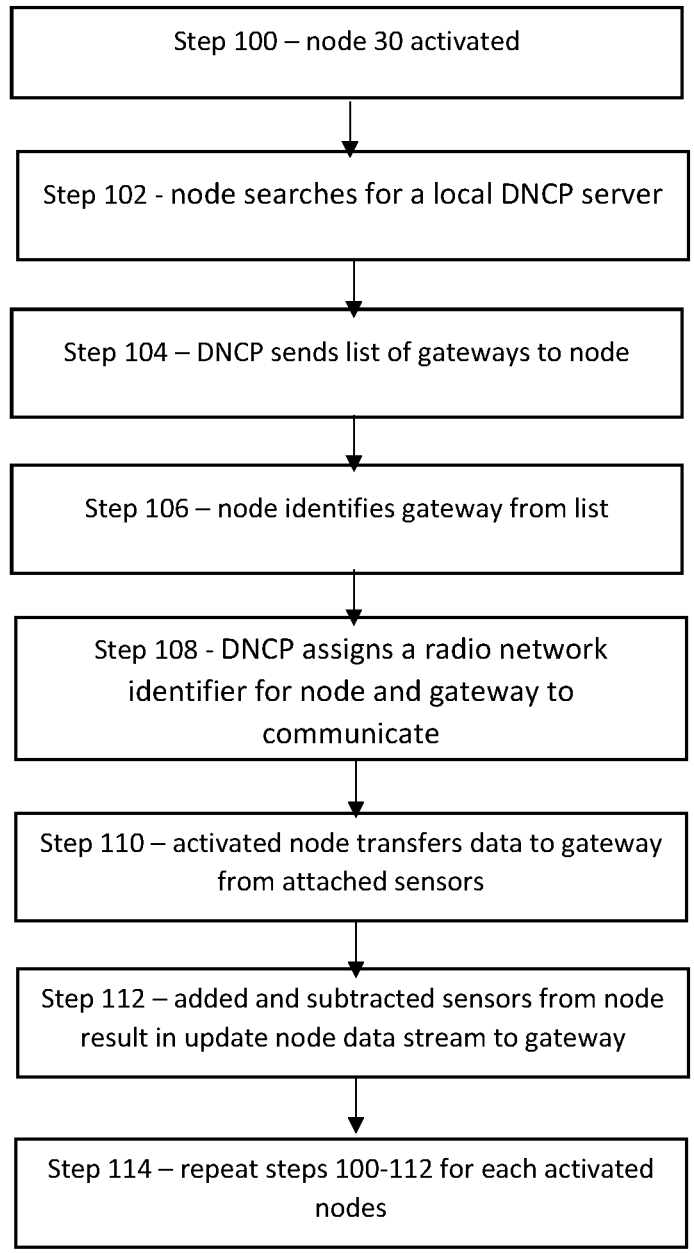
FIG. 5 is a flow chart showing the connectivity of sensors, gateways and a DNCP servers, in accordance with one embodiment.

More particularly for any one node 30, FIG. 5 illustrates a start-up and connection sequence between node 30, one of gateways 40 and DNCP server 50. At step 100, once node 30 is activated, wireless transmitter 36 of node 30 searches for a local DNCP server 50 at step 102. Upon detection of an activated node 30, at step 104 the DNCP server provides a list of registered gateways. At step 106, the node 30 uses this list to determine best gateway for connectivity. At step 108, once node 30 determines which gateway 40 to connect to, DNCP 50 assigns a radio network identifier for node 30 to use to communicate with that gateway 40.

Because of the nature of the tobacco storage and fermentation warehouses, it may be that certain gateways 40 are better located or positioned within the room or near the room to a particular node 30. Additionally, given the large number of nodes 30 supported by each gateway 40, and the ever-changing nature and amounts of connected nodes 30 to any one gateway 40 (e.g. because of the constant formation and removal of pilones and the addition of new sensors 10/nodes 30 thereto) the node 30 uses the list provided by DNCP server 50 to determine a best gateway 40 among all available gateways 40 to connect to. It is noted that DNCP server 50 may be in communication with the multiple gateways 40 to maintain an accurate and update to list of available gateways for provision to requesting nodes 30.

Once node 30 selects gateway 40 among the available gateways 40, DNCP server 50 at step 108 noted above, provides a network identifier for node 30 and its data feed being emitted from wireless module 36 and also alerts gateway 40 of the incoming data. At that point, at step 110 activated node 30 is transmitting sensor and internal real time data to gateway 40. It is understood that such data flowing between gateway 40 and node 30 includes all the data of the various connected sensors 10, including those sensors 10 already connected when node 30 is activated. At step 112, as sensors 10 are added or removed from activated node 30, the data feed to connected gateway 40 is increased/decreased with node 30 providing an indicative flagging of the data feed for identification purposes (i.e. an added sensor 10 to activated node 30 and its data stream can be flagged with a new sensor identifier as appropriate to associate the a portion of the node 30 data to such sensor 10).

At step 114, this process is repeated for the activation of every new node 30. In this manner any number of nodes 30 may be repeatedly added and subtracted on a semi-frequent basis without the need for accounting for dedicated connections and IP addressing between specific nodes and gateways.

For example, in the prior art when a new node 30 is added to the network the new node 30 would have to have an address that is shared with other nodes 30 or have a new ID configured in the firmware of the gateway(s). Instead, the present arrangement, dynamically configuring node network identifiers via the DNCP 50 process outlined above allows for greater flexibility and change over time. This allows for nodes to be pre-configured with just a standard firmware and sent to any customer without requiring extensive updating and connection protocols to be implemented on-site by IT professionals.

Figure 6:
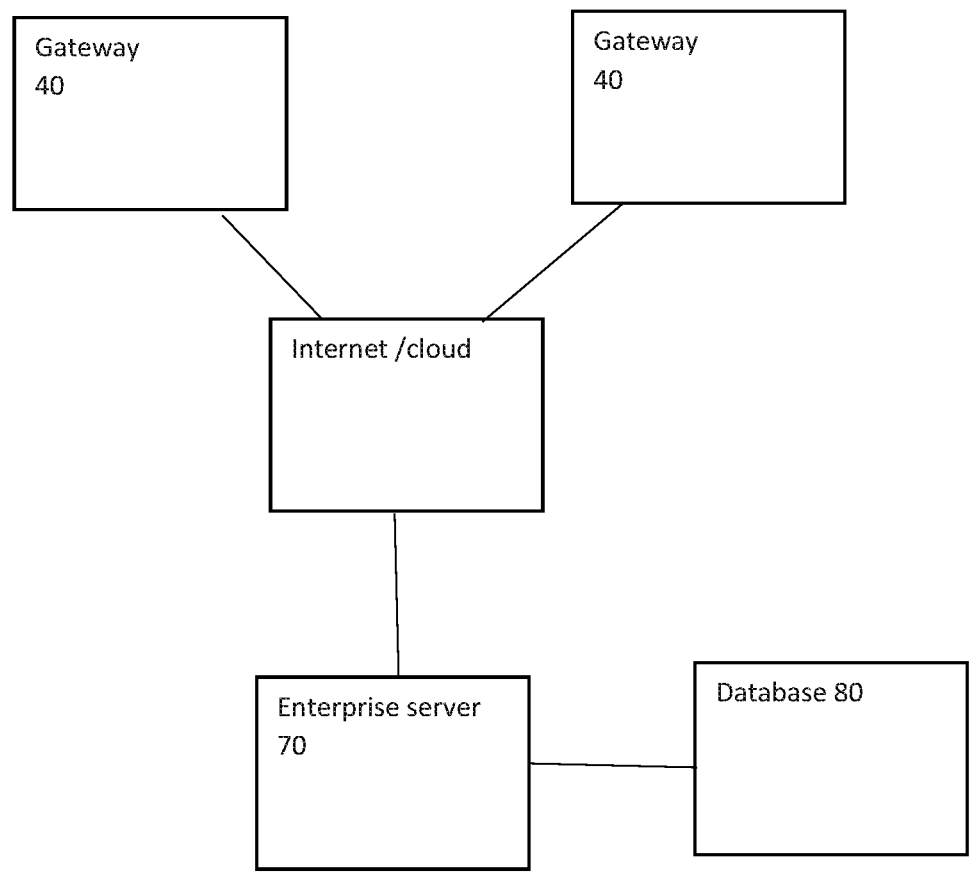
FIG. 6 illustrates a data management pathway from gateways to an enterprise server and database in accordance with one embodiment.

As illustrated in the final FIG. 6 one or more gateways 40 from a particular tobacco processing facility are shown connected, for example via the cloud/internet, to an enterprise server 70 and connected database 80. Server 70 and database 80 are together configured to ultimately collect, store and, otherwise make available for real time viewing all of the collected stream data from each of sensors 10.

As an outcome, FIG. 7 shows an exemplary data field generated by nodes 30 and sensors 10 implemented in the above system, for example in in the warehouse shown in FIG. 4. Using for example a web application, or other such program, a user may be engaged to generate a data collection sheet 200 that is configured for use and storage on enterprise server 70 and/or database 80.

For example, in one operation showing the data structures available via the data collection of the present system. In this example there are two active nodes 30 (Node "a" associated with pilone #1 and Node "b" associated with pilone #2). In this example each pilone has its own associated node 30. Moreover, in the example, each of nodes 30 in this example have two sensors 10 (e.g. "node a sensor 1" and "node a sensor 2"). The same arrangement is used for node 30 labeled node "b" for the second pilone. As shown in FIG. 7 data collection sheet 200 shows the relevant identification data as well as a tablet entry for real time calculations for humidity moisture and temperature from sensors 10.

It is noted that the illustrated data collection sheet is a simplification. It is understood that such sheet 200, when scaled to industry would have hundreds of entries, at least one for each pilone, and at least one node 30 per pilone, with again, at least one sensor 10 per node—and its data flow therefrom. The data is shown as static in FIG. 7, but it is understood that such table can be configured for real time data display. Moreover, the arrangement on FIG. 7 shows a single node 30 to pilone arrangement, but it is understood that one node could theoretically support sensors inserted into different pilones, and likewise multiple nodes 30 may have sensors in the same pilone, with data collection sheet being coded and arranged as needed for organization of such data.

It is understood that such version of collected data in data collection sheet 200 is only exemplary. Other configurations and data elements may be included and/or removed as desired from data collection sheet based on the desires of the tobacco manufacturer. For example, more or less sensors 10 per pilone may be desired. In any case, the above described node 30 and sensor 10 system is easily configurable as new nodes 30 and sensors 10 are brought online. Moreover, regarding all of the embodiments described herein, it is noted that they relate to the environmental monitoring of tobacco production. However, such an arrangement may be equally applied in other industries, including agricultural industries for similar environmental monitoring.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A process for the management of environmental data for tobacco production, said process including the following steps:
   inserting a plurality of sensors, each into separate collections of fermenting tobacco leaves;
   connecting said plurality of sensors to a communication node for collecting data;
   wherein said process includes multiple plurality of sensors, each inserted into a plurality of communication nodes;
   adapting a DNCP server to receive at least one communication from said plurality of communication nodes to identify a data gateway among a plurality of available gateways for connecting said communications nodes; and
   transmitting environmental data from said sensors and said communication nodes to said gateway for transmission to a server.

2. The process as claimed in claim 1, wherein said collections of tobacco leaves are piles in the form of either pilones or burros, and within each pile a plurality of sensors are inserted.

3. The process as claimed in claim 1, wherein each of said collections of tobacco leaves is assigned said communication node, among a plurality of communication nodes.

4. The process as claimed in claim 3, wherein said DNCP server is in communication with said plurality of available gateways, and configured to generate a list including data for each of said plurality of gateways related to available bandwidth and ability to support data from said communication nodes.

5. The process as claimed in claim 1, wherein an additional one or more sensors are connected with said node, such that said transmitted environmental data from one of said communication nodes to said gateway for transmission to a server, includes data from said sensor and said at least one additional sensor.

6. A cigar produced from tobacco, where said tobacco undergoes a process for the management of environmental data of said tobacco during production, said process including the steps of:
   inserting a plurality of sensors, each into separate collections of fermenting tobacco leaves;
   connecting said plurality of sensors to a communication node for collecting data;
   wherein said process includes multiple plurality of sensors, each inserted into a plurality of communication nodes;
   adapting a DNCP server to receive at least one communication from said plurality of communication nodes to identify a data gateway among a plurality of available gateways for connecting said communications nodes; and
   transmitting environmental data from said sensors and said communication nodes to said gateway for transmission to a server.

* * * * *